United States Patent
Takahashi

(10) Patent No.: US 6,179,364 B1
(45) Date of Patent: Jan. 30, 2001

(54) BONNET FOR AUTOMOBILE

(75) Inventor: Akio Takahashi, Saitama (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/310,190

(22) Filed: May 12, 1999

(30) Foreign Application Priority Data

May 13, 1998 (JP) .................................................. 10-130679

(51) Int. Cl.[7] .................................................. B62D 25/10
(52) U.S. Cl. ........................................... 296/76; 296/191
(58) Field of Search .................... 296/76, 191; 180/69.2, 180/69.21

(56) References Cited

U.S. PATENT DOCUMENTS

| | | | |
|---|---|---|---|
| 2,709,108 | * | 5/1955 | Eggert . |
| 3,201,168 | * | 8/1965 | Young . |
| 4,634,167 | * | 1/1987 | Moriki et al. ........................... 296/31 |
| 4,988,144 | * | 1/1991 | Johnson et al. ....................... 296/192 |
| 5,115,878 | * | 5/1992 | Hayata ............................... 180/69.21 |
| 5,124,191 | * | 6/1992 | Seksaria ............................... 428/178 |
| 5,197,560 | * | 3/1993 | Oda et al. ........................... 180/69.21 |
| 5,605,371 | * | 2/1997 | Borchelt et al. ...................... 296/188 |
| 5,833,024 | * | 11/1998 | Kaneko ............................... 180/69.2 |
| 5,988,305 | * | 11/1999 | Sakai et al. .......................... 180/69.2 |
| 6,048,022 | * | 4/2000 | Ishibashi et al. ..................... 296/188 |

FOREIGN PATENT DOCUMENTS 5-155355    6/1993    (JP) .

\* cited by examiner

Primary Examiner—D. Glenn Dayoan
Assistant Examiner—Mickki D. Murray
(74) Attorney, Agent, or Firm—Arent Fox Kintner Plotkin & Kahn, PLLC

(57) ABSTRACT

In a bonnet for an automobile in which an inner frame 22 as a reinforcement is placed to integrally underlie an outer panel 21, assuming that the thickness of the bonnet 20 is expressed as a distance from an upper surface of the outer panel 21 to a lower surface of the inner frame 22, the thickness of the bonnet is reduced at a front portion rather than at a rear portion of the bonnet, whereby a reduction in rigidity is attained at the front portion. From an empirical observation, a smaller obstacle tends to come into collision with the front portion of the bonnet, while a larger obstacle with the rear portion of the bonnet, and therefore, the thickness of the bonnet is made thinner at the front portion than at the rear portion of the bonnet. Consequently, a damage to an obstacle, in particular, to a smaller obstacle, produced when it comes into collision with the bonnet is limited to a minimum level.

7 Claims, 9 Drawing Sheets

BONNET FOR AUTOMOBILE

BACKGROUND OF THE INVENTION

The present invention relates to an improvement on a bonnet for an automobile.

An example of a conventional bonnet for an automobile is disclosed in a Japanese Patent Unexamined Publication No. Hei. 5-155355 reciting "an engine hood construction for an automobile". As shown in FIGS. 10 and 11, an engine hood 70 is constructed such that an engine hood inner panel 71 serving as a reinforcement member is placed so as to integrally underlie an engine hood outer panel 72. The engine hood inner panel 71 is constituted by a reinforcement portion 73 (frame) having a U-shaped cross section and formed in a grid-like fashion. A through hole 74 is formed in the bottom of an apex portion 75 where frame constituent members intersect each other and a through hole 76 is also formed in side wall portions of respective reinforcing portions 77, 78 in the vicinity of the apex portion 75 in order to attain a reduction in rigidity of the apex portion 75 to thereby alleviate impact against an obstacle.

However, even if the rigidity at the apex portion 75 is tried to be reduced by forming a through hole 74 in the bottom of the apex portion 75 of the frame constituent members and a through hole 76 in the side wall portions of the respective reinforcing portions 77, 78 in the vicinity of the apex portion, the side wall portions arranged in a grid-like fashion still remain too strong, and therefore, if an obstacle comes into collision with the engine hood in the vicinity of such side wall portions of the respective reinforcing portions 77, 78, impact produced by the collision cannot sufficiently be alleviated.

In addition, if the through holes 74, 76 formed, respectively, in the bottom of the apex portions and the side wall portions are enlarged, this will make it impossible to maintain a rigidity originally required for the engine hood inner panel 71, resulting in an excessive reduction in rigidity of the engine hood.

SUMMARY OF THE INVENTION

To cope with the above problem, an object of the present invention is to provide a bonnet for an automobile that can sufficiently alleviate impact against an obstacle, while maintaining a rigidity originally required for the bonnet of an automobile.

The above-mentioned object can be achieved by a bonnet for an automobile, according to the present invention, comprising:

an outer panel; and an inner frame placed to integrally underlies the outer panel for reinforcing a rigidity of the outer panel;

in which a thickness of the bonnet which is defined by a distance from an upper surface of the outer panel to a lower surface of the inner frame is made thinner at a front portion of the bonnet than at a rear portion thereof, to thereby reduce the rigidity at the front portion of the bonnet.

An empirical observation assures that a smaller obstacle tends to come into collision with the front portion of the bonnet, while a larger one with the rear portion of the bonnet. From this, a damage to an obstacle, in particular, to a smaller obstacle, produced when it comes into collision with the front portion of the bonnet is limited to a minimum level by making the thickness of the front portion of the bonnet thinner than that of the rear portion thereof.

In the above-mentioned bonnet for the automobile, according to the present invention, the thickness of said front portion is preferably set to fall within a range of $0.3T \leq t \leq 0.6T$, where T is the thickness of the rear portion of said bonnet and t is the thickness of the front portion thereof.

With the thickness t of the bonnet front portion being 0.3T, it is not possible to obtain a sufficient rigidity required for the bonnet, while with the thickness of 0.6T or greater, it is not possible to obtain a sufficient impact absorption effect. Therefore, a reconciliation of rigidity and impact absorption performance required for the bonnet is aimed for by setting the thickness of the bonnet front portion so as to fall within a range of $0.3T \leq t \leq 0.6T$.

BRIEF DESCRIPTION OF THE DRAWINGS

FIGS. 8(a) and 8(b) show an explanatory view explaining a first function of the bonnet according to the present invention, in which FIG. 8(a) is directed to an example of the present invention and FIG. 8(b) is directed to a conventional structure;

FIGS. 9(a) and 9(b) shows an explanatory view explaining a second function of the bonnet according to the present invention, in which FIG. 9(a) is directed to an example of the present invention and FIG. 9(b) is directed to a conventional structure;

DETAILED DESCRIPTION OF THE PREFERRED EMBODIMENTS

Figure 1:
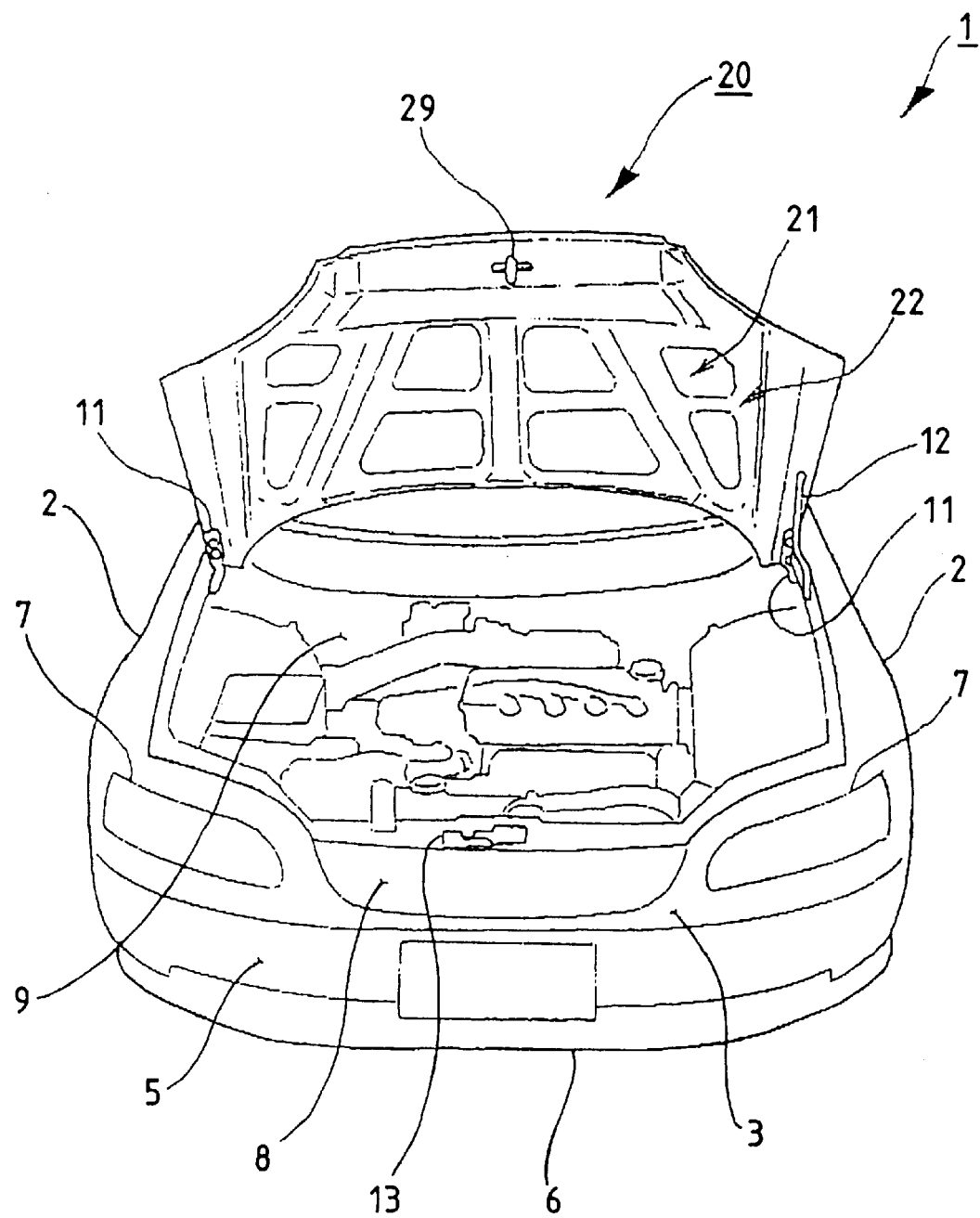
FIG. 1 shows a perspective view of a front portion of a vehicle body according to the present invention.

Referring to the accompanying drawings, an embodiment of the present invention will be described below. The drawings are to be viewed in a direction indicated by reference numerals.

FIG. 1 is a perspective view of a front portion of a body of an automobile according to the present invention.

The front portion of a body of an automobile, or more simply, the vehicle body front portion 1 comprises front fenders 2, 2 constituting the front side portions of the vehicle body, a front fascia 3 connecting these front fenders 2, 2, and a bonnet (hood) 20 that is placed over the front fenders 2, 2 and the front fascia 3. Reference numeral 5 denotes a front bumper, reference numeral, 6 a front skirt, 7 a headlamp, 9 an engine compartment constituted by the front fenders 2, 2, front fascia 3 and bonnet 20, 11 a hinge, 12 a stay, and 13 a hook.

Figure 2:
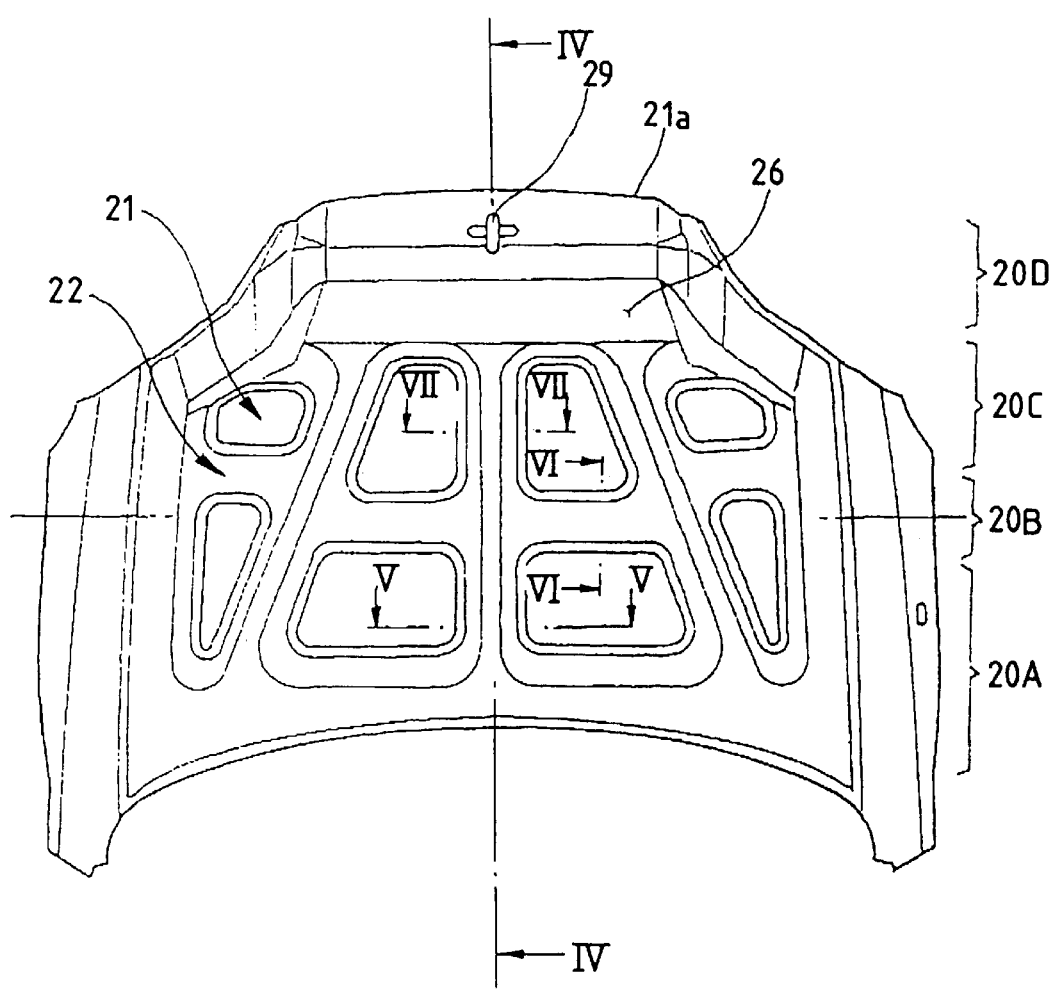
FIG. 2 shows a bottom view of a bonnet according to the present invention.

FIG. 2 is a bottom view of a bonnet according to the present invention.

The bonnet 20 comprises an outer panel 21 and an inner frame 22 placed to underlie this outer panel 20 as a reinforcement. Namely, the outer panel 21 is placed over the inner frame with a predetermined space being maintained therebetween, and a peripheral portion 21a of the outer panel 21 is bent in such a manner that the inner frame 22 is integrally coupled with the outer panel 21.

Reference numeral 20A denotes a rear portion of the bonnet 20, reference numeral 20B an intermediate portion of the bonnet 20, 20C a front portion of the bonnet 20, and 20D a leading end portion of the bonnet 20.

Figure 3:
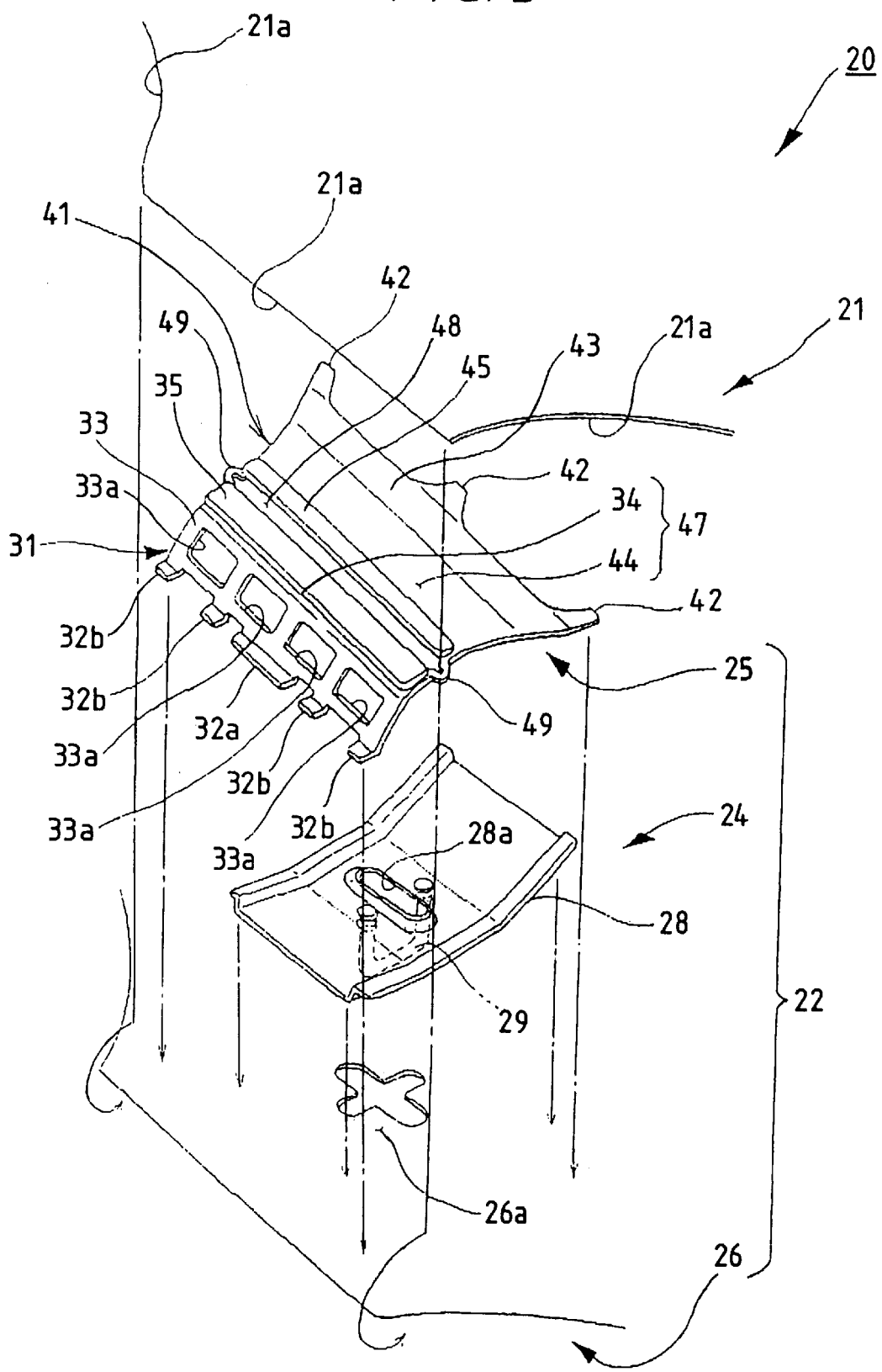
FIG. 3 shows an exploded perspective view of the bonnet according to the present invention.

FIG. 3 is an exploded perspective view of the bonnet according to the present invention. The inner frame 22 comprises a striker 24, a reinforcement plate 25 placed over this striker 24 from thereabove, and an inner frame main body 26 to which the striker 24 and the reinforcement plate 25 are attached. Reference numeral 26a denotes a portion to which the striker 24 is mounted.

The striker 24 comprises in turn a base plate 28 formed of a thick plate by bending the same as required and a striker main body 29 mounted to this base plate 28, with the striker main body 29 being welded or bonded to the mounting portion 26a of the inner frame main body 26 via the base plate 28. In addition, the striker 24 is used to fix the bonnet 20 on a side of the engine compartment 9 (refer to FIG. 1) by engaging the striker main body 29 with the hook 13 (refer to FIG. 1). In addition, the base plate 28 is provided with a through hole 28a for the hook 13 to pass through.

Figure 4:
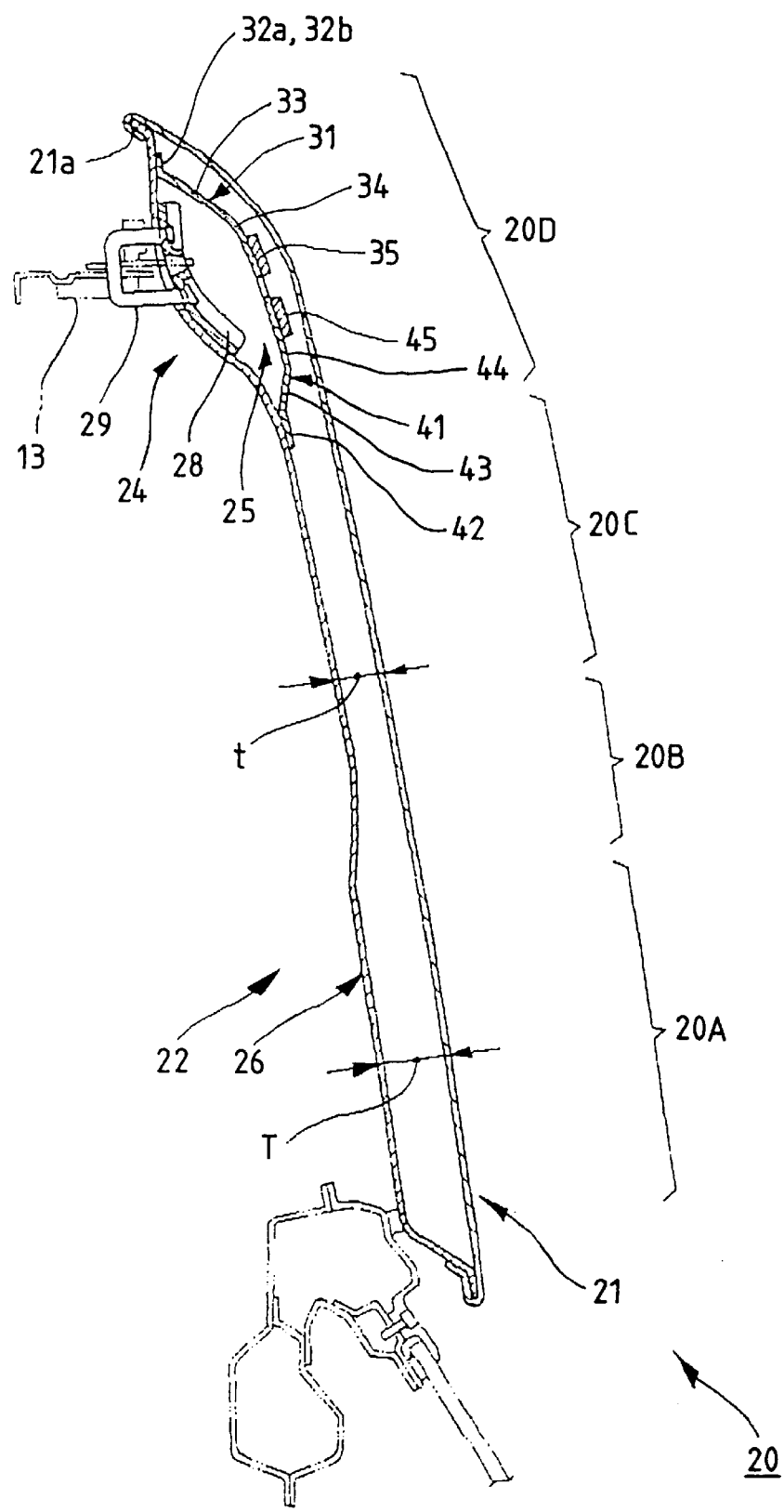
FIG. 4 shows a sectional view taken along line II—II of FIG. 2.

The reinforcement plate 25 comprises a front reinforcement plate 31 supported on the front portion of the inner frame main body 26 in a cantilever-like fashion and a rear reinforcement plate 41 supported on the rear portion of the inner frame main body also in a cantilever-like fashion, as shown in FIG. 4.

The front reinforcement plate 31 comprises in turn supporting portions 32a and supporting portions 32b that are attached to the inner frame main body 26, a front inclined plate 33 extended from these supporting portions 32a and supporting portions 32b, a front ceiling plate 34 formed continuously with this front inclined plate 33 and a front stiffener 35 as an edge reinforcement for reinforcing an edge of the front ceiling plate. The front inclined plate 33 is provided with relief holes 33a—for setting the rigidity at a predetermined level.

The rear reinforcement plate 41 comprises supporting portions 42 that are attached to the inner frame main body 26, a rear inclined plate 43 extended from those supporting portions 42, a rear ceiling plate 44 formed continuously with this rear inclined plate 43 and a rear stiffener 45 as an edge reinforcement for reinforcing an edge of the rear ceiling plate 44.

In other words, the reinforcement plate 25 is formed as bent into the shape by a ceiling plate 47 constituted by the front inclined plate 33, front ceiling plate 34 and rear ceiling plate 44, and the rear inclined plate 43, as clearly shown in FIGS. 3 and 4. Moreover, the reinforcement plate 25 is divided into the front and rear ceiling plates 34, 44 by forming a slit 48 in the ceiling plate 47, and the front and rear stiffeners 35, 45 are mounted, respectively, on the front and rear ceiling plates 34, 44 so as to reinforce the edges thereof.

The front and rear stiffeners 35, 45 are members for avoiding a risk of deformation being concentrated on a part of the front and rear ceiling plates 34, 44 by reinforcing the respective edges thereof.

In addition, the front and rear ceiling plates 31, 41 are connected to each other by connecting the front and rear ceiling plates 34, 44 at ends thereof with V-shaped bridges 49, 49, so that the reinforcement plate 25 can be formed as one piece, thereby trying to reduce the number of components used.

FIG. 4 is a sectional view taken along line IV—IV of FIG. 2, showing a longitudinal sectional view of the bonnet 20.

The inner frame main body 26 is a reinforcement frame in which the frame height is reduced at a front portion 20C of the bonnet 20 when compared with that at a rear portion 20A thereof.

With the frame width being maintained constant, for instance, the rigidity of the bonnet 20 is determined by a distance from an upper surface of the outer panel 21 to a lower surface of the inner frame main body 26. From this, assuming that the thickness of the bonnet 20 at the front portion 20C is t, while the thickness at the rear portion 20A is T, the thickness t of the front portion 20C is set so as to fall within a range of $0.3T \leq t \leq 0.6T$.

Namely, when the thickness t of the front portion 20C of the bonnet 20 is 0.3 relative to the thickness T of the rear portion thereof, a sufficient rigidity cannot be obtained, while when it becomes 0.6 or greater, a sufficient reduction in rigidity cannot be attained.

In reality, the rigidity of the bonnet 20 is determined by the modulus of section of respective portions involved. Assuming that the sectional configuration of the bonnet 20 is a rectangle having a width b and a thickness (height) h, with a modulus of section being z, the modulus of section can generally be expressed by a formula; $Z = bh^2/6$. Since the modulus of section is proportionate to a square root of the height, assuming now that the modulus of section of the front portion 20C is d, the modulus of section of the rear portion 20A being D, the modulus of section of the front portion 20C falls within a range of $0.09D \leq d \leq 0.36D$.

In other words, the rigidity of the front portion 20C is limited to 9% to 36% of the rigidity of the rear portion 20A, and thus a sufficient reduction in rigidity can be attained.

Next, referring to FIGS. 5 to 7, sectional configurations of respective portions of the bonnet 20 will be described.

Figure 5:
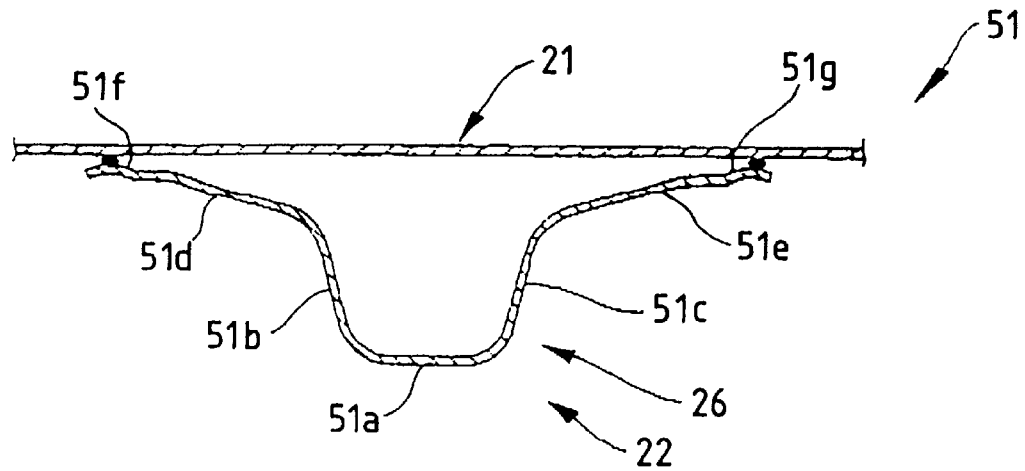
FIG. 5 shows a sectional view taken along line V—V of FIG. 2.

FIG. 5 is a sectional view taken along line V—V of FIG. 2, showing a sectional configuration of the rear portion 20A of the bonnet 20 (refer to FIG. 2).

A sectional configuration of a rear portion of the inner frame main body 26 is constructed such that left and right erect wall portions 51b, 51c are formed in such a manner as to extend from a base portion 51a toward the outer panel 21 substantially perpendicularly thereto, and that a left bent portion 51d is extended from the left erect wall portion 51b outwardly substantially in parallel with the outer panel 21, while a right bent portion 51e is extended from the right erect wall portion 51c outwardly substantially in parallel with the outer panel 21, that flange portions 51f, 51g are formed at an end of the left and right bent portions 51d, 51e, respectively, and that these flange portions are bonded or welded to the outer panel 21.

Figure 6:
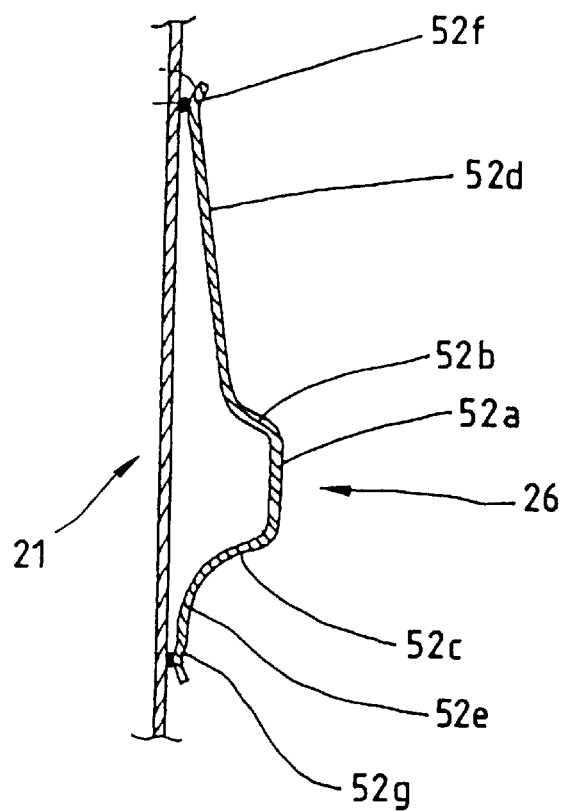
FIG. 6 shows a sectional view taken along line VI—VI of FIG. 2.

FIG. 6 is a sectional view taken along line VI—VI of FIG. 2, showing the intermediate portion 20B of the bonnet 20 (refer to FIG. 2).

A sectional configuration of an intermediate portion of the inner frame main body 26 is constructed such that front and rear erect wall portions 52b, 52c are formed in such a manner as to extend from a base portion 52a toward the outer panel 21 substantially perpendicularly thereto, that a front bent portion 52d is extended from this front erect wall portion 52b outwardly substantially in parallel with the outer panel 21, while a rear bent portion 52e is extended from the rear erect wall portion 52c outwardly substantially in parallel with the outer panel 21, that flange portions 52f, 52g are formed at an end of the front and rear bent portions 52d, 52e, respectively, and that these flange portions 52f, 52g are bonded or welded to the outer panel 21. In addition, the front bent portion 52d is formed longer than the rear bent portion 52e.

Figure 7:
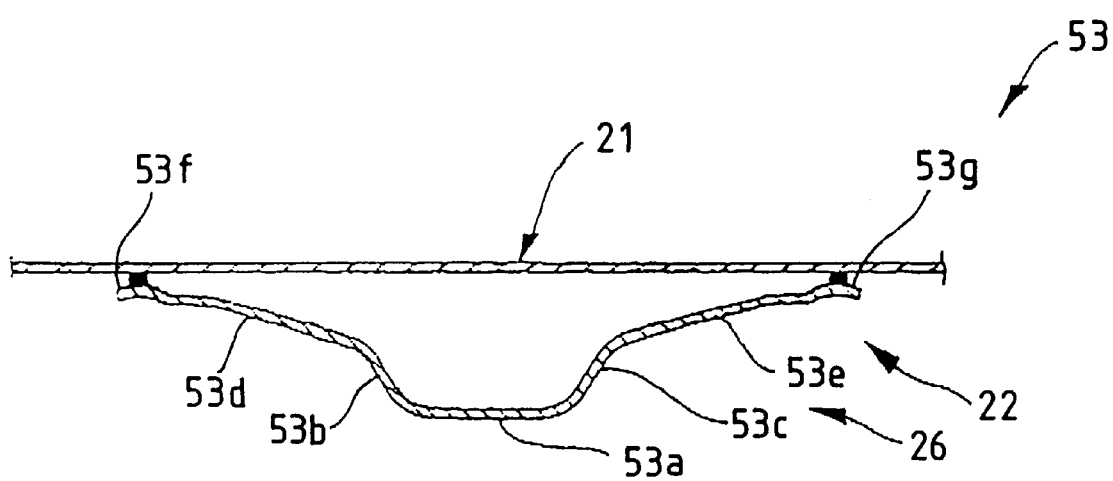
FIG. 7 shows a sectional view taken along line VII—VII of FIG. 2.

FIG. 7 is a sectional view taken along line VII—VII of FIG. 2, showing the front portion 20C of the bonnet 20 (refer to FIG. 2).

A sectional configuration of a front portion of the inner frame main body 26 comprises a frame base portion 53a, left and right erect wall portions 53b, 53c, left and right bent portions 53d, 53e and flange portions 53f, 53g. The left and right erect wall portions 53b, 53c are formed shorter than the left and right erect wall portions 51b, 51c shown in FIG. 5 as partially constituting the sectional configuration of the rear portion.

Functions of the bonnet 20 described heretofore will be described below.

Figure 8A:
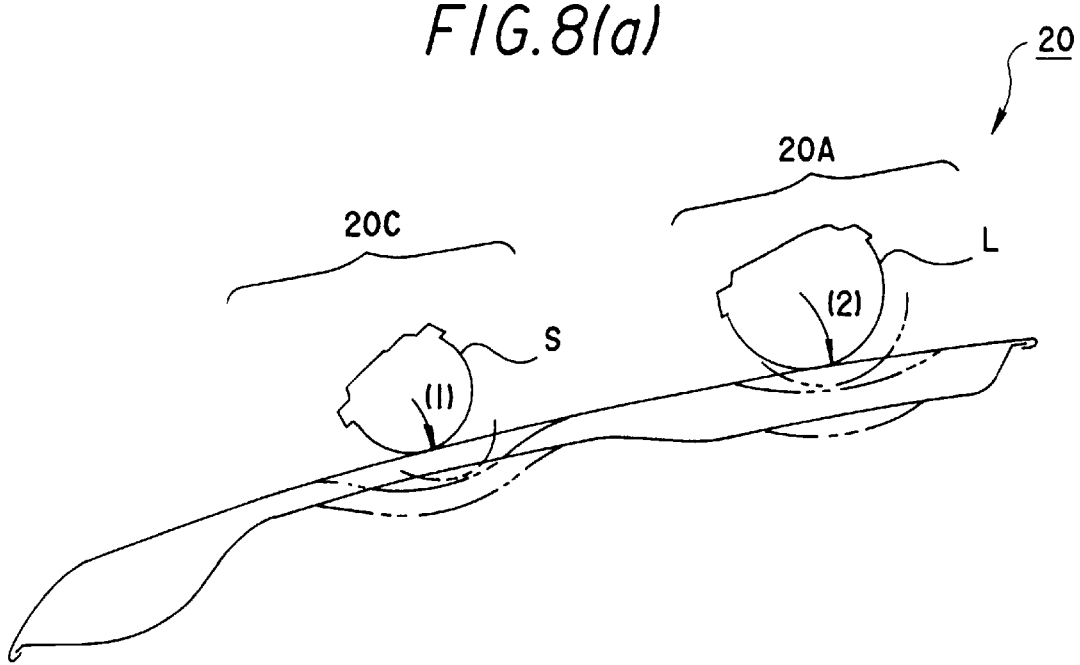
Figure 8B:
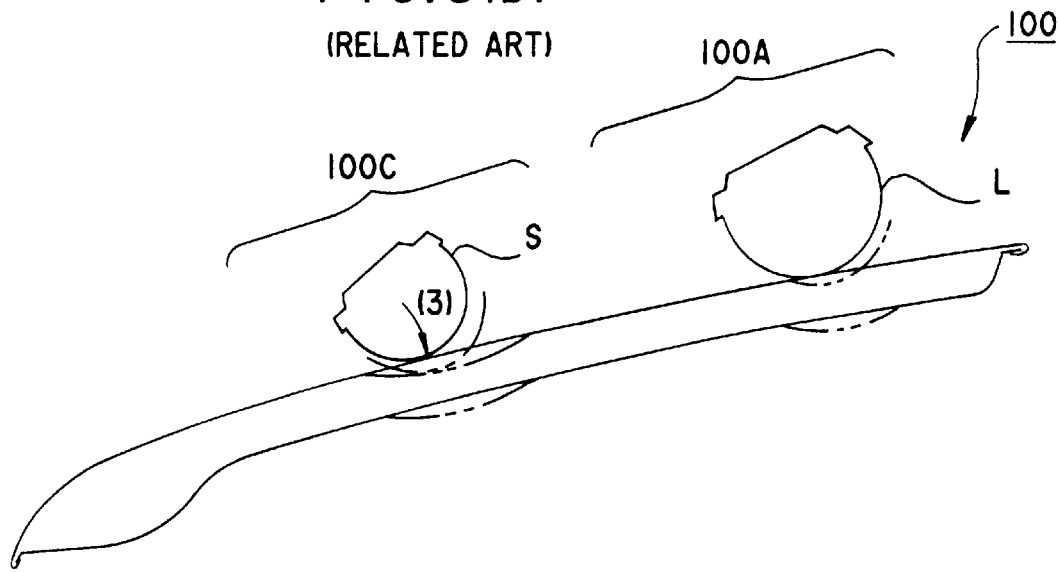

FIGS. 8(a), (b) are explanatory views explaining a first function of the bonnet according to the present invention, FIG. 8(a) showing the bonnet 20 according to the embodiment of the present invention, FIG. 8(b) showing a bonnet 100 as an example for comparison.

In FIG. 8(a), illustrates the theory tell us that a smaller obstacle S tends to come into collision with the front portion 20C of the bonnet 20, while a larger obstacle L tends to come into collision with the rear portion 20A of the bonnet 20. In addition, it is a general opinion that a larger obstacle L tends to be sturdier and more resistant to impact, while a smaller obstacle is rather delicate and more fragile against impact.

From these observation and opinion, a reduction in rigidity is aimed for at the front portion 20C rather than at the rear portion 20A of the bonnet 20 by varying the rigidity of the bonnet 20 at the front portion 20C and rear portion 20A thereof.

Since the rigidity at the front portion 20C of the bonnet 20 is reduced so as to deal mainly with smaller obstacles, in a case where a smaller obstacle S is brought into collision therewith in a direction as indicated by an arrow (1), the front portion 20C exhibits a predetermined impact absorption effect to thereby limit a damage to the smaller obstacle S to a minimum level.

In contrast, since the rigidity at the rear portion 20A of the bonnet 20 is maintained so as to deal mainly with larger obstacles, even if a larger obstacle L is brought into collision therewith in a direction indicated by an arrow (2), the rear portion 20A exhibits a predetermined impact absorption effect to thereby limit a damage to the larger obstacle L to a minimum level.

In FIG. 8(b), with the bonnet 100, the rigidity is maintained uniform at front and rear portions 100C, 100A, and therefore, in a case where a smaller obstacle comes into collision with the front portion 100C of the bonnet 100 in a direction as shown by an arrow (3), since the rigidity at the front portion 100C is too high, the impact absorption effect is limited. Thus, the smaller obstacle S is damaged very badly.

Figure 9A:
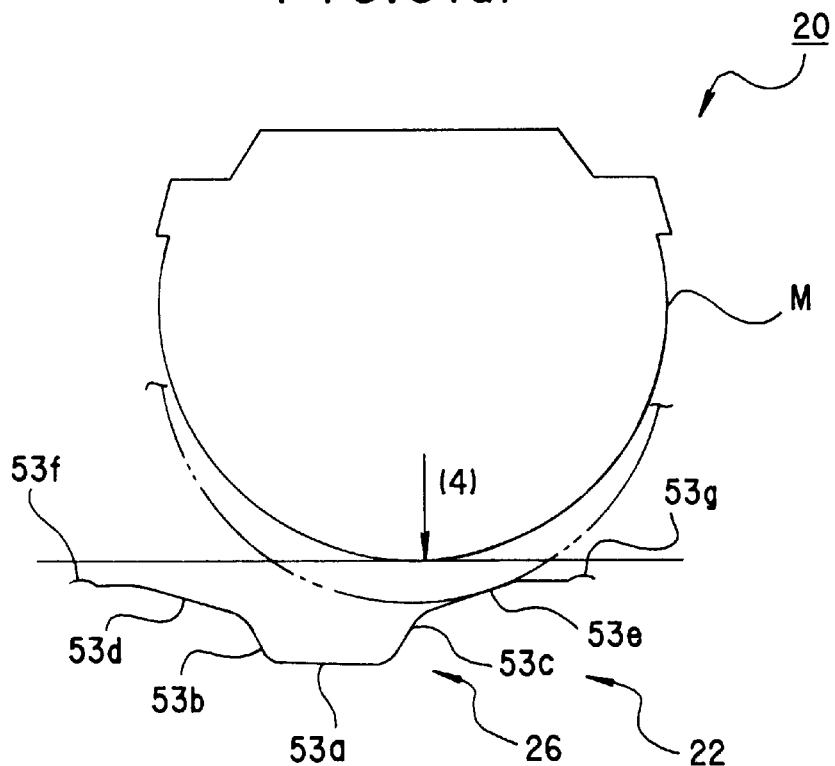

FIGS. 9(a), (b) are explanatory views describing a second function of the bonnet according to the embodiment of the present invention.

In FIG. 9(a), with the bonnet 20 according to the embodiment, the right bent portion 53e is formed on the inner frame main body 26 between the flange portion 53g and the right erect wall portion 53c, this providing a great magnitude of impact absorption effect. For instance, even in a case where an obstacle M comes into collision with the bonnet in the vicinity of the flange portion 53g, the right bent portion 53c existing thereat exhibits an impact absorption effect to thereby limit a damage to the obstacle M to a minimum level.

In addition, the left and right bent portions 51d, 51e are also provided on the section 51 of the rear portion shown in FIG. 5, and therefore a similar impact absorption effect is exhibited thereat. Furthermore, the front and rear bent portions 52d, 52e are also provided on the section 42 of the intermediate portion, and therefore a similar impact absorption effect is also shown thereat.

Figure 9B:
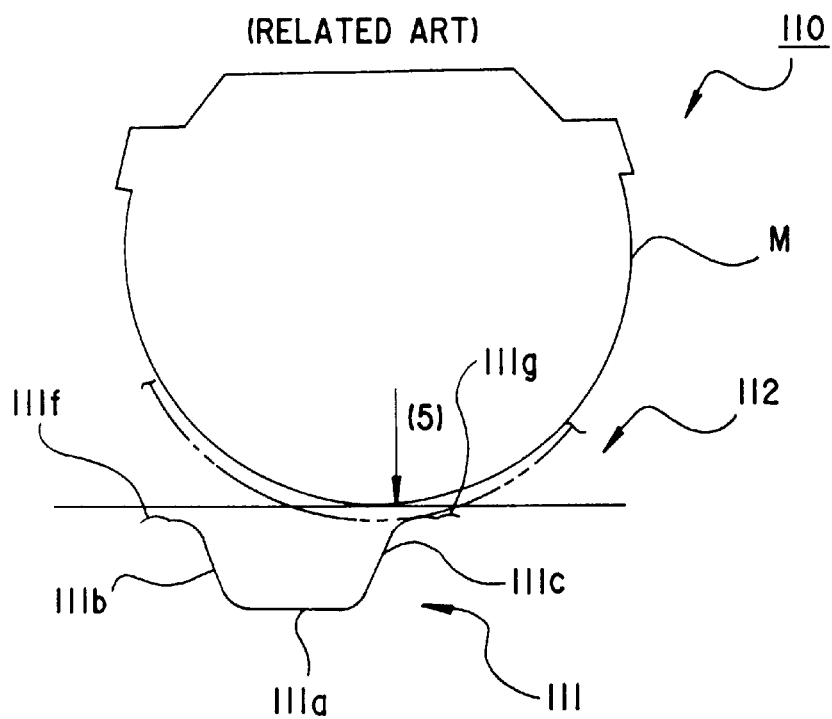
Figure 10:
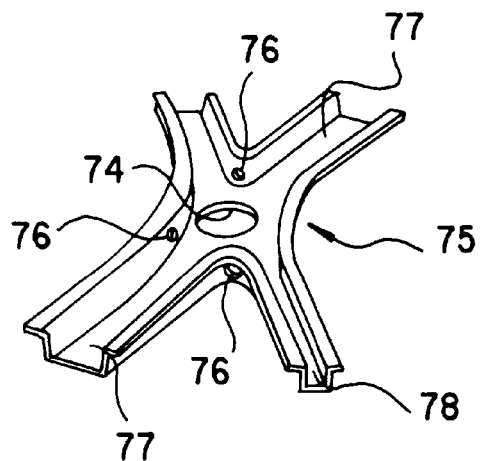
FIG. 10 shows a perspective view of an apex portion where frame constituent members intersect each other in a conventional bonnet for an automobile.
Figure 11:
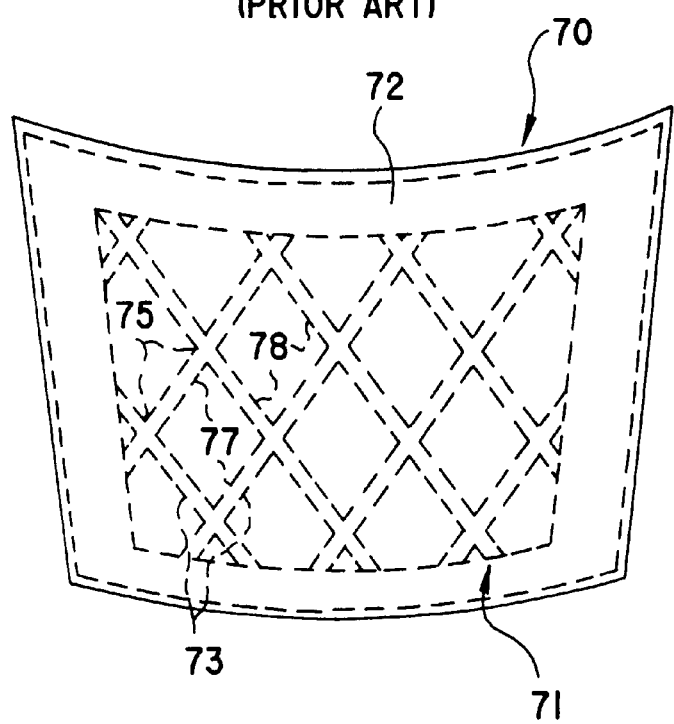
FIG. 11 shows a plane view of an engine hood structure of the conventional bonnet.

In FIG. 9(b), an inner frame main body 111 of the comparison bonnet 110 is constructed such that left and right erect wall portions 111b, 111c are extended from a frame base portion 111a toward an outer panel 112 substantially perpendicularly thereto, that flange portions 111f, 111g are directly formed on these left and right erect wall portions 111b,111c, and that these flange portions 111f, 111g are attached to the outer panel 112. Therefore, in a case where an obstacle M comes into collision with the bonnet in the vicinity of the flange portion 111g in a direction as indicated by an arrow (5), since a force generated is applied to the right erect wall portion 111c substantially perpendicularly thereto, there is provided only a limited impact absorption effect. Therefore, the obstacle M is badly damaged.

The present invention is based on Japanese Patent Application No. Hei. 10-130679, which is incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

The present invention, which is constructed as described heretofore, provides the following effectiveness.

In accordance with the present invention, from an empirical observation, since a smaller obstacle tends to come into collision with the front portion of the bonnet, while a larger one with the rear portion of the bonnet, the thickness of the front portion of the bonnet is made thinner than that of the rear portion thereof, whereby a damage to an obstacle, in particular, to a smaller obstacle, produced when it comes into collision with the front portion of the bonnet is limited to a minimum level.

In addition, in accordance with the present invention, assuming that the thickness of the rear portion of the bonnet is T, and the thickness of the front portion thereof is t, the thickness of the front portion is set to fall within a range of $0.3T \leq t \leq 0.6T$, thereby making it possible to reconcile the rigidity and impact absorption performance required for the bonnet.

What is claimed is:

1. A bonnet for an automobile comprising:

an outer panel; and an inner frame integral with a bottom surface of said outer panel to reinforce a rigidity of said outer panel;

in which a thickness of said bonnet which is defined by a distance from an upper surface of said outer panel to a lower surface of said inner frame is made thinner at a front portion of said bonnet than at a rear portion thereof, to thereby reduce the rigidity at said front portion of said bonnet, wherein said inner frame includes a front portion comprising:

a base part;

left and right erect wall parts which are respectively extended from both ends of said base part towards said outer panel substantially perpendicularly to said outer panel;

left and right flange parts respectively secured to said outer panel; and left and right bend parts extending substantially in parallel with said outer panel and respectively coupling said left and right erect wall parts with said left and right flange parts.

2. A bonnet for an automobile according to claim 1, wherein the thickness of said front portion is set to fall within a range of 0.3T≦t≦0.6T, where T is the thickness of said rear portion of said bonnet and t is the thickness of said front portion thereof.

3. A bonnet for an automobile according to claim 1, wherein said inner frame include s a rear portion comprising:

a base portion;

left and right erect wall portions which a re respectively extended from both ends of said base portion towards said outer panel substantially perpendicularly to said outer panel;

left and right flange portions respectively secured to said outer panel; and left and right bend portions extending substantially in parallel with said outer panel and respectively coupling said left and right erect wall portions with said left and right flange portions.

4. A bonnet for an automobile according to claim 3, wherein said inner frame includes a front portion comprising:

a base part;

left and right erect wall parts which are respectively extended from both ends of said base part towards said outer panel substantially perpendicularly to said outer panel;

left and right flange parts respectively secured to said outer panel; and left and right bend parts extending substantially in parallel with said outer panel and respectively coupling said left and right erect wall parts with said left and right flange parts.

5. A bonnet for an automobile according to claim 4, wherein a distance at said front portion between said base part and said outer panel in a direction perpendicular to said outer panel is smaller than a distance between said base portion and said outer panel at the rear portion of said inner frame in the direction.

6. A bonnet for an automobile according to claim 3, wherein said inner frame includes an intermediate portion comprising:

a base portion;

front and rear erect wall portions which are respectively extended from both ends of said base portion towards said outer panel substantially perpendicularly to said outer panel;

front and rear flange portions respectively secured to said outer panel;

front bend portion extending substantially in parallel with said outer panel and coupling said front erect wall portion and said front flange portion; and rear bend portion extending substantially in parallel with said outer panel and coupling said rear erect wall portion and said rear flange portion.

7. A bonnet for an automobile according to claim 6, wherein said front bent portion is longer than said rear bent portion in the front-rear direction of said bonnet.

* * * * *